United States Patent
Vick et al.

(10) Patent No.: US 9,098,309 B2
(45) Date of Patent: *Aug. 4, 2015

(54) POWER CONSUMPTION OPTIMIZED TRANSLATION OF OBJECT CODE PARTITIONED FOR HARDWARE COMPONENT BASED ON IDENTIFIED OPERATIONS

(75) Inventors: Christopher A. Vick, San Jose, CA (US); Gregory M. Wright, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

This patent is subject to a terminal disclaimer.

(21) Appl. No.: 13/303,841

(22) Filed: Nov. 23, 2011

(65) Prior Publication Data

US 2013/0080805 A1 Mar. 28, 2013

Related U.S. Application Data

(60) Provisional application No. 61/538,655, filed on Sep. 23, 2011.

(51) Int. Cl.
*G06F 1/32* (2006.01)
*G06F 9/45* (2006.01)
*G06F 9/455* (2006.01)

(52) U.S. Cl.
CPC ............. *G06F 8/4432* (2013.01); *G06F 8/447* (2013.01); *G06F 9/45516* (2013.01); *G06F 9/45525* (2013.01); *Y02B 60/181* (2013.01)

(58) Field of Classification Search
CPC ............ G06F 9/45504; G06F 9/45508; G06F 9/45516; G06F 9/3017; G06F 9/455; G06F 9/4552; G06F 9/3879; G06F 9/50; G06F 9/5044; G06F 9/5027; G06F 9/5066; G06F 9/5094; G06F 9/45; G06F 9/3885; G06F 1/329; G06F 9/30174; G06F 1/3293
See application file for complete search history.

(56) References Cited

U.S. PATENT DOCUMENTS 5,790,874 A 8/1998 Takano et al.
6,301,674 B1 10/2001 Saito et al.
(Continued)

FOREIGN PATENT DOCUMENTS

CN 100561461 C 11/2009
CN 101923492 A * 5/2013
(Continued)

OTHER PUBLICATIONS

Singh K., et al., "Real time power estimation and thread scheduling via performance counters", Computer Architecture News ACM USA, vol. 37, No. 2, May 2009, pp. 46-55, XP002694998, ISSN: 0163-5964.
(Continued)

*Primary Examiner* — Kenneth Kim
(74) *Attorney, Agent, or Firm* — Nicholas A. Cole

(57) ABSTRACT

In the various aspects, a virtual machine operating at the machine layer may use power consumption models to partition object code into portions, identify the relative power efficiencies of the mobile device processors for the various code portions, and route the code portions to the mobile device processors that can perform the operations using the least amount of energy. A dynamic binary translator process may translate the object code portions into an instruction set language supported by the hardware component identified as being preferred. The code portions may be executed and the amount of power consumed may be measured, with the measurements used to generate and/or update performance and power consumption models.

32 Claims, 11 Drawing Sheets

(56) References Cited

U.S. PATENT DOCUMENTS

| | | | |
|---|---|---|---|
| 6,457,082 B1 | 9/2002 | Zhang et al. | |
| 6,618,042 B1 | 9/2003 | Powell | |
| 6,684,390 B1 | 1/2004 | Goff | |
| 7,124,283 B2* | 10/2006 | Yamada et al. | 712/209 |
| 7,146,613 B2 | 12/2006 | Chauvel et al. | |
| 7,234,126 B2 | 6/2007 | Catthoor et al. | |
| 7,243,243 B2 | 7/2007 | Gedeon | |
| 7,386,844 B2 | 6/2008 | Heishi et al. | |
| 7,389,403 B1 | 6/2008 | Alpert et al. | |
| 7,596,430 B2* | 9/2009 | Aguilar et al. | 700/299 |
| 7,694,306 B2 | 4/2010 | Minor et al. | |
| 7,730,340 B2 | 6/2010 | Hu et al. | |
| 7,739,530 B2 | 6/2010 | Takayama et al. | |
| 7,770,034 B2 | 8/2010 | Nanja | |
| 7,802,241 B2 | 9/2010 | Roy et al. | |
| 7,836,321 B2 | 11/2010 | Aaltonen et al. | |
| 7,873,814 B1 | 1/2011 | Cohen et al. | |
| 7,904,893 B2 | 3/2011 | Munter et al. | |
| 8,074,093 B1 | 12/2011 | Johnson | |
| 8,108,850 B2 | 1/2012 | Chang et al. | |
| 8,146,064 B2 | 3/2012 | Chen et al. | |
| 8,595,520 B2 | 11/2013 | Li et al. | |
| 8,634,302 B2 | 1/2014 | Khawer et al. | |
| 8,683,243 B2* | 3/2014 | Wu et al. | 713/320 |
| 8,930,722 B2* | 1/2015 | Sprangle et al. | 713/300 |
| 2004/0010783 A1 | 1/2004 | Moritz et al. | |
| 2004/0054937 A1 | 3/2004 | Williams et al. | |
| 2004/0111715 A1 | 6/2004 | Stone | |
| 2005/0046467 A1 | 3/2005 | Kase et al. | |
| 2005/0088155 A1 | 4/2005 | Osburn et al. | |
| 2006/0095902 A1 | 5/2006 | Nakaike et al. | |
| 2006/0146056 A1 | 7/2006 | Wyatt | |
| 2006/0212677 A1 | 9/2006 | Fossum | |
| 2006/0224904 A1 | 10/2006 | Zimmer et al. | |
| 2006/0253715 A1 | 11/2006 | Ghiasi et al. | |
| 2007/0074011 A1 | 3/2007 | Borkar et al. | |
| 2007/0174828 A1 | 7/2007 | O'Brien et al. | |
| 2007/0226686 A1 | 9/2007 | Beardslee et al. | |
| 2008/0126764 A1 | 5/2008 | Wu et al. | |
| 2008/0160977 A1 | 7/2008 | Ahmaniemi et al. | |
| 2008/0168287 A1 | 7/2008 | Berry et al. | |
| 2008/0301474 A1 | 12/2008 | Bussa et al. | |
| 2009/0089767 A1 | 4/2009 | Daynes et al. | |
| 2009/0158248 A1 | 6/2009 | Linderman et al. | |
| 2009/0241122 A1 | 9/2009 | Wong | |
| 2009/0271646 A1 | 10/2009 | Talwar et al. | |
| 2009/0300394 A1 | 12/2009 | Archer et al. | |
| 2009/0320003 A1 | 12/2009 | Barsness et al. | |
| 2010/0153954 A1 | 6/2010 | Morrow et al. | |
| 2010/0174923 A1 | 7/2010 | Houlihan et al. | |
| 2010/0185833 A1* | 7/2010 | Saito et al. | 712/203 |
| 2010/0216490 A1 | 8/2010 | Linden | |
| 2011/0088021 A1 | 4/2011 | Kruglick | |
| 2011/0093733 A1 | 4/2011 | Kruglick | |
| 2011/0153307 A1 | 6/2011 | Winkel et al. | |
| 2011/0154309 A1 | 6/2011 | Sazegari et al. | |
| 2011/0211036 A1 | 9/2011 | Tran | |
| 2011/0271170 A1 | 11/2011 | Walker | |
| 2011/0296149 A1 | 12/2011 | Carter et al. | |
| 2011/0320766 A1 | 12/2011 | Wu et al. | |
| 2012/0204042 A1 | 8/2012 | Sistla et al. | |
| 2013/0073883 A1 | 3/2013 | Vick | |
| 2013/0185581 A1 | 7/2013 | Michalak et al. | |
| 2014/0019723 A1* | 1/2014 | Yamada et al. | 712/208 |

FOREIGN PATENT DOCUMENTS

| | | |
|---|---|---|
| EP | 0926596 A2 | 6/1999 |
| EP | 2317729 A1 | 5/2011 |
| JP | H09251076 A | 9/1997 |
| JP | H11249896 A | 9/1999 |
| JP | 2003122582 A | 4/2003 |
| JP | 2006004123 A | 1/2006 |
| KR | 20080095443 A | 10/2008 |
| TW | 201024950 A | 7/2010 |
| TW | 201131936 A | 9/2011 |
| WO | 0248837 A2 | 6/2002 |

OTHER PUBLICATIONS

Teodorescu R., et al., "Variation-aware application scheduling and power management for chip multiprocessors", Computer Architecture News ACM USA, vol. 36, No. 3, Jun. 2008, pp. 363-374, XP002694999, ISSN: 0163-5964.

International Search Report and Written Opinion—PCT/US2012/053937—ISA/EPO—Nov. 27, 2012.

Wu Y., et al., "A HW/SW co-designed heterogeneous multi-core virtual machine for energy-efficient general purpose computing", Code Generation and Optimization (CGO), 2011 9th Annual IEEE/ACM International Symposium on, IEEE, Apr. 2, 2011, pp. 236-245, XP031863949, DOI: 10.1109/CGO.2011.5764691 ISBN: 978-1-61284-3568.

* cited by examiner

POWER CONSUMPTION OPTIMIZED TRANSLATION OF OBJECT CODE PARTITIONED FOR HARDWARE COMPONENT BASED ON IDENTIFIED OPERATIONS

RELATED APPLICATIONS

This application claims the benefit of priority to U.S. Provisional Application No. 61/538,655, entitled "Dynamic Partitioning for Heterogeneous Cores" filed Sep. 23, 2011, the entire contents of which are hereby incorporated by reference.

This application is also related to U.S. patent application Ser. No. 13/303,871 entitled "Dynamic Power Optimization for Computing Devices" filed Nov. 23, 2011.

BACKGROUND

Cellular and wireless communication technologies have seen explosive growth over the past several years. This growth has been fueled by better communications, hardware, larger networks and more reliable protocols. Wireless service providers are now able to offer their customers an ever-expanding array of features and services, and provide users with unprecedented levels of access to information, resources and communications. To keep pace with these service enhancements, mobile electronic devices (e.g., cellular phones, tablets, laptops, etc.) have become more powerful than ever. A single mobile device may now include multiple complex processors and system of chips (SOCs), which are commonly used to perform complex and power intensive operations without a wired connection to a power source. As a result, a mobile device's battery life and power consumption characteristics are becoming ever more important considerations for consumers of mobile devices.

Increased battery life maximizes the user's experience by allowing users to do more with a wireless device for longer periods of time. To maximize battery life, mobile devices typically attempt to optimize power consumption using dynamic voltage and frequency scaling techniques. These techniques allow programmable device resources/pipelines to run in a lower power and/or lower performance mode when non-critical applications or low load conditions are detected. For example, a mobile device may be configured to place one or more processors and/or resources in a low power state when idle. While these techniques may improve the overall battery performance, they require that device processors and/or resources be placed in an idle state and cannot improve the power consumption characteristics of individual applications or processes executing on the device. Optimizing applications to reduce the amount of power consumed by mobile device during execution will greatly enhance the user experience.

SUMMARY

The various aspects include methods of optimizing object code during execution on a computing device, including receiving in a computing device system software compiled object code, analyzing the object code to identify operations required during execution of the object code, partitioning the object code into object code units based on identified operations, identifying a preferred hardware component for each object code unit, translating at least one object code unit into an instruction set supported by a hardware component identified as being preferred for that object code unit, and executing the instruction set in the identified hardware component. In an aspect, translating at least one object code unit into an instruction set supported by a hardware component identified as being preferred for that object code unit includes performing in a dynamic binary translator an instruction-sequence-to-instruction-sequence translation of the received object code. In an aspect, performing in the dynamic binary translator an instruction-sequence-to-instruction-sequence translation of the received object code includes translating a first instruction set architecture into a second instruction set architecture. In an aspect, the first instruction set architecture is the same instruction set architecture as the second instruction set architecture. In an aspect, identifying a preferred hardware component for each object code unit includes identifying the performance characteristics of various hardware components of the computing device for executing the identified operations. In an aspect, identifying a preferred hardware component for each object code unit includes identifying relative power efficiencies of various hardware components of the computing device for executing the identified operations. In an aspect, identifying relative power efficiencies of various hardware components of the computing device for executing the identified operations includes using a power consumption model for the various hardware components to predict an amount of power each hardware component may consume in executing each code unit, and selecting one of the various hardware components predicted to consume a least amount of power. In an aspect, the method further includes measuring an amount of power consumed in the hardware component executing each code unit, comparing the measured amount of power consumed to predictions of the power consumption model, and modifying the power consumption model based on a result of the comparison.

Further aspects include a computing device that includes means for analyzing the object code to identify operations required during execution of the object code, means for partitioning the object code into object code units based on identified operations, means for identifying a preferred hardware component for each object code unit, means for translating at least one object code unit into an instruction set supported by a hardware component identified as being preferred for that object code unit, and means for executing the instruction set in the identified hardware component. In an aspect, means for translating at least one object code unit into an instruction set supported by a hardware component identified as being preferred for that object code unit includes means for performing in a dynamic binary translator an instruction-sequence to instruction-sequence translation of the received object code. In an aspect, means for performing in the dynamic binary translator an instruction-sequence to instruction-sequence translation of the received object code includes means for translating a first instruction set architecture into a second instruction set architecture. In an aspect, means for translating a first instruction set architecture into a second instruction set architecture includes means for translating the instructions such that the first instruction set architecture is the same instruction set architecture as the second instruction set architecture. In an aspect, means for identifying a preferred hardware component for each object code unit includes means for identifying the performance characteristics of various hardware components of the computing device for executing the identified operations. In an aspect, means for identifying a preferred hardware component for each object code unit includes means for identifying relative power efficiencies of various hardware components of the computing device for executing the identified operations. In an aspect, means for identifying relative power efficiencies of various hardware components of the computing device for executing the identified operations includes means for using a power consumption model for the various hardware components to predict an amount of power each hardware component may consume in executing each code unit and selecting one of the various hardware components predicted to consume a least amount of power. In an aspect, the computing device further includes means for measuring an amount of power consumed in the hardware component executing each code unit, means for comparing the measured amount of power consumed to predictions of the power consumption model, and means for modifying the power consumption model based on a result of the comparison.

Further aspects include a computing device having a memory, and a processor coupled to the memory, wherein the processor is configured with processor-executable instructions to perform operations including receiving compiled object code in system software, analyzing the object code to identify operations required during execution of the object code, partitioning the object code into object code units based on identified operations, identifying a preferred hardware component for each object code unit, translating at least one object code unit into an instruction set supported by a hardware component identified as being preferred for that object code unit, and executing the instruction set in the identified hardware component. In an aspect, the processor is configured with processor-executable instructions such that translating at least one object code unit into an instruction set supported by a hardware component identified as being preferred for that object code unit includes performing in a dynamic binary translator an instruction-sequence to instruction-sequence translation of the received object code. In an aspect, the processor is configured with processor-executable instructions such that performing in the dynamic binary translator an instruction-sequence to instruction-sequence translation of the received object code includes translating a first instruction set architecture into a second instruction set architecture. In an aspect, the processor is configured with processor-executable instructions such that the first instruction set architecture is the same instruction set architecture as the second instruction set architecture. In an aspect, the processor is configured with processor-executable instructions such that identifying a preferred hardware component for each object code unit includes identifying the performance characteristics of various hardware components of the computing device for executing the identified operations. In an aspect, the processor is configured with processor-executable instructions such that identifying a preferred hardware component for each object code unit includes identifying relative power efficiencies of various hardware components of the computing device for executing the identified operations. In an aspect, the processor is configured with processor-executable instructions such that identifying relative power efficiencies of various hardware components of the computing device for executing the identified operations includes using a power consumption model for the various hardware components to predict an amount of power each hardware component may consume in executing each code unit and selecting one of the various hardware components predicted to consume a least amount of power. In an aspect, the processor is configured with processor-executable instructions to perform operations further including measuring an amount of power consumed in the hardware component executing each code unit, comparing the measured amount of power consumed to predictions of the power consumption model, and modifying the power consumption model based on a result of the comparison.

Further aspects include a non-transitory computer readable storage medium having stored thereon processor-executable software instructions configured to cause a processor to perform operations for optimizing object code during execution on a computing device, the operations including receiving in a computing device system software compiled object code, analyzing the object code to identify operations required during execution of the object code, partitioning the object code into object code units based on identified operations, identifying a preferred hardware component for each object code unit, translating at least one object code unit into an instruction set supported by a hardware component identified as being preferred for that object code unit, and executing the instruction set in the identified hardware component. In an aspect, the stored processor-executable software instructions are configured to cause a processor to perform operations such that translating at least one object code unit into an instruction set supported by a hardware component identified as being preferred for that object code unit includes performing in a dynamic binary translator an instruction-sequence to instruction-sequence translation of the received object code. In an aspect, the stored processor-executable software instructions are configured to cause a processor to perform operations such that performing in the dynamic binary translator an instruction-sequence to instruction-sequence translation of the received object code includes translating a first instruction set architecture into a second instruction set architecture. In an aspect, the stored processor-executable software instructions are configured to cause a processor to perform operations such that the first instruction set architecture is the same instruction set architecture as the second instruction set architecture. In an aspect, the stored processor-executable software instructions are configured to cause a processor to perform operations such that identifying a preferred hardware component for each object code unit includes identifying the performance characteristics of various hardware components of the computing device for executing the identified operations. In an aspect, the stored processor-executable software instructions are configured to cause a processor to perform operations such that identifying a preferred hardware component for each object code unit includes identifying relative power efficiencies of various hardware components of the computing device for executing the identified operations. In an aspect, the stored processor-executable software instructions are configured to cause a processor to perform operations such that identifying relative power efficiencies of various hardware components of the computing device for executing the identified operations includes using a power consumption model for the various hardware components to predict an amount of power each hardware component may consume in executing each code unit and selecting one of the various hardware components predicted to consume a least amount of power. In an aspect, the stored processor-executable software instructions are configured to cause a processor to perform operations including measuring an amount of power consumed in the hardware component executing each code unit, comparing the measured amount of power consumed to predictions of the power consumption model, and modifying the power consumption model based on a result of the comparison.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
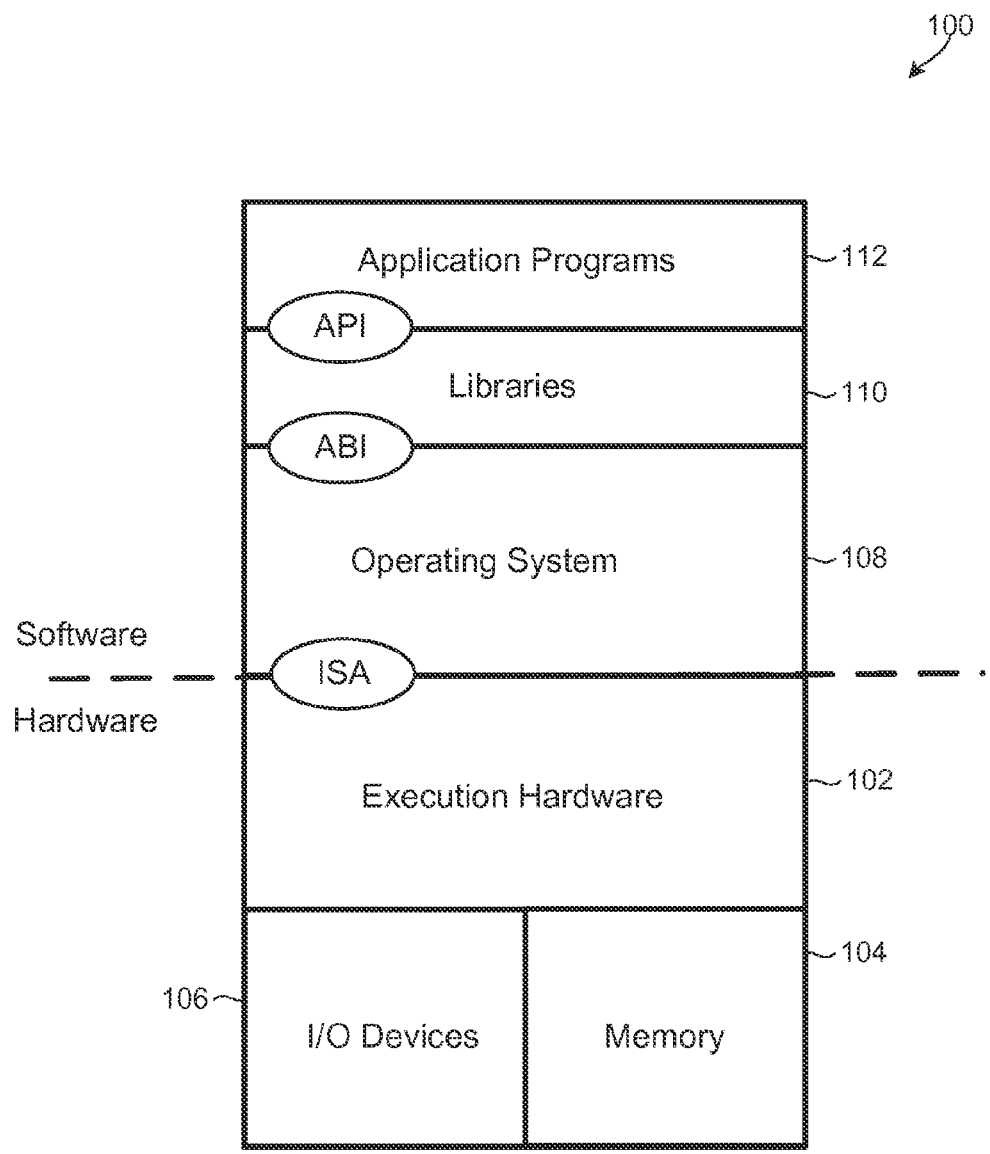
FIG. 1 is a layered computer architectural diagram illustrating logical components and interfaces in a computing system suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "computing device" are used interchangeably herein to refer to any one or all of cellular telephones, personal data assistants (PDA's), palmtop computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and operate under battery power such that power conservation methods are of benefit.

The term "resource" is used herein to refer to any of a wide variety of circuits (e.g., ports, clocks, buses, oscillators, etc.), components (e.g., memory), signals (e.g., clock signals), functions, and voltage sources (e.g., voltage rails) which may be used to support processors and clients running on a computing device.

The term "system on chip" (SOC) is used to refer to a single integrated circuit (IC) chip that contains multiple resources and processors integrated on a single substrate. A single SOC may contain circuitry for digital, analog, mixed-signal, and radio-frequency functions. A single SOC may also include any number of general purpose and/or specialized processors (DSP, modem processors, video processors). SOCs may also include software for controlling the integrated resources and processors, as well as for controlling peripheral devices.

Existing performance and power management techniques typically involve controlling the operating/power states of one or more processors and/or resources. For example, duty cycling is a common power management technique in which the processors are placed in an idle state/sleep mode by default, and periodically woken to attend to pending tasks and events. However, these existing techniques do not fully exploit the different processing capabilities and power characteristics of individual hardware components in a multiprocessor system and do not change the code executed by the applications/processes based on the available hardware.

The various aspects provide methods, systems, and devices that use virtualization techniques that may be implemented within a hypervisor layer to finely control the performance/power characteristics of active processors/resources. A virtual machine receives object code for execution, analyzes the object code to recognize operations and parameters characterizing the operations to be performed by the device processors, and performs binary to binary translations to transform or translate the object code into new object code that can function more efficiently on the various hardware components present in a specific mobile device. This transformation of object code may be accomplished according to a device specific model. Using a model that is associated with the processor architecture of a given mobile device, the virtual machine may determine that executing the object code on a particular hardware device may be inefficient, too power intensive, too slow, etc. The virtual machine may then translate the binary object code to a different object binary code having different operators (e.g., shift and add operations vs. multiplication operations) in order to achieve the preferred performance. The virtual machine may also translate the binary object code generated for a first processor (e.g., a general processor) to binary object code optimized for another processor (e.g., a specialized processor).

Generally, the performance and power consumption characteristics (herein "performance characteristics") of individual hardware components depend on a number of factors, including the physical characteristics of the components, the computer's architecture, and the specific operations executed by the software processes/tasks during execution. The number of instructions and the amount of power consumed to accomplish a given processing task (e.g., execute a software process) may vary from one type of device to another, depending upon their architectures and how they are implemented within the computer system. In addition, the performance characteristics of a single type of processor (e.g., Intel™ Core i7) can vary significantly from lot-to-lot and chip-to-chip. Due to these variances, it is difficult to optimize software applications for a specific hardware component because the actual performance characteristics of the hardware are not available until the program is actually executed.

Various aspects provide methods, systems, and devices that improve the performance of, and/or reduce the amount of power consumed by, active processors/resources in a multiprocessor system. Performance and power consumption information may be collected from one or more hardware components at runtime and used to generate performance and power consumption models (herein "performance models"). The performance models may be used to identify the relative efficiencies/performance capabilities of the various hardware components with respect to specific operations.

Application programs/processes may be partitioned into units or chunks, and the units/chunks may be distributed to different processing components based on the identified efficiencies/capabilities. In order to do this, object code of an application may be analyzed by a virtual machine functioning below the operating system to determine the processor on the mobile device that can best process selected portions (e.g., most efficiently, using the least amount of power, fastest, most available, etc.). For example, the virtual machine may assess whether an object code segment can be processed more efficiently (e.g., from a power/performance perspective) on a processor other than the central processing unit (CPU), such as in the digital signal processor (DSP) of a modem chip or in a graphics processor unit (GPU) processor. If so, a code generator may regenerate that portion of object code into a format that is executable by that other processor, and the selected processor may be directed to execute the regenerated code segment. The code regeneration process may include adding the pointers, links, and process control instructions necessary to enable the object code to be executed by the multiple processors in the device as if they were processed by the CPU. By executing some code portions on non-CPU processors that can execute the instruction more efficiently, the various aspects enable significant gains in performance, efficiency, and power consumption, compared to simply executing applications on the device CPU.

As mentioned above, virtualization techniques may be used to improve the performance of active processors/resources. These virtualization techniques may be implemented in a virtual machine (VM), which is a software application that executes application programs like a physical hardware machine A virtual machine provides an interface between application programs and the physical hardware, allowing application programs tied to a specific instruction set architecture (ISA) to execute on hardware implementing a different instruction set architecture.

Application programs are typically distributed in binary format as object code. Without the assistance of virtual machines, object code must be executed on hardware that supports the specific instruction set architecture (e.g., Intel IA-32, etc.) and operating system interface for which it was generated. Virtual machines circumvent these limitations by adding a layer of software that supports the architectural requirements of the application program and/or translates the application program's instruction set architecture into the instruction set architecture supported by the hardware.

FIG. 1 is a layered architectural diagram illustrating the logical components and interfaces in a typical computer system suitable for implementing the various aspects. The illustrated computer system architecture 100 includes both hardware components and software components. The hardware components may include execution hardware (e.g., an application processor, digital signal processor, etc.) 102, input/output devices 106, and one or more memories 104. The software components may include an operating system 108, a library module 110, and one or more application programs 112.

The application programs 112 use an application program interface (API) to issue high-level language (HLL) library calls to the library module 110. The library module 110 uses an application binary interface (ABI) to invoke services (e.g., via operating system calls) on the operating system 108. The operating system 108 communicates with the hardware components using a specific instruction set architecture (ISA), which is a listing of specific operation codes (opcode) and native commands implemented by the execution hardware 102.

The application binary interface defines the machine as seen by the application program processes, whereas the application program interface specifies the machine's characteristics as seen by a high-level language program. The ISA defines the machine as seen by the operating system.

Figure 2A:
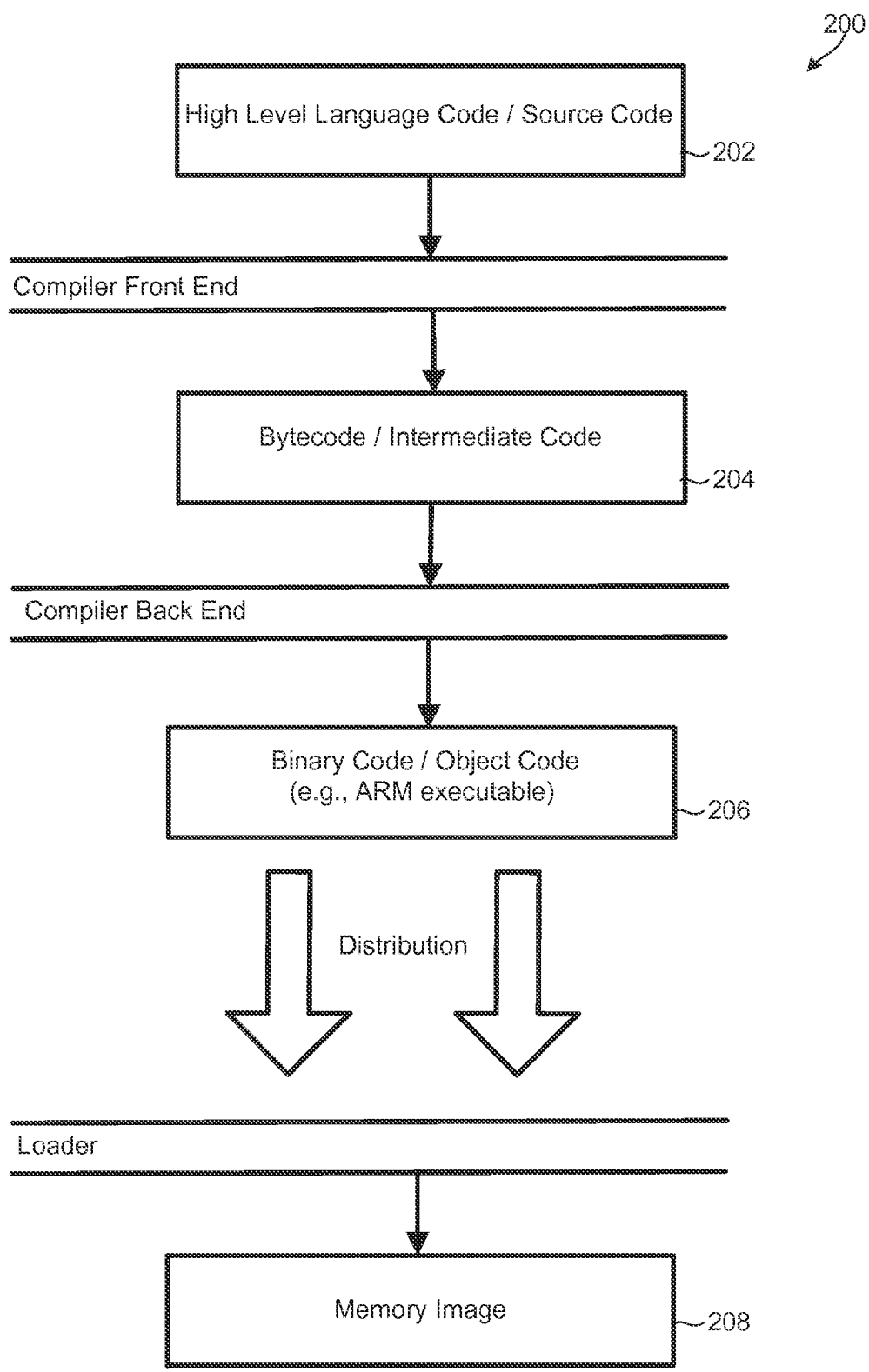
FIGS. 2A and 2B are process flow diagrams illustrating logical components and code transformations for distributing code in a format suitable for implementing the various aspects.
Figure 2B:
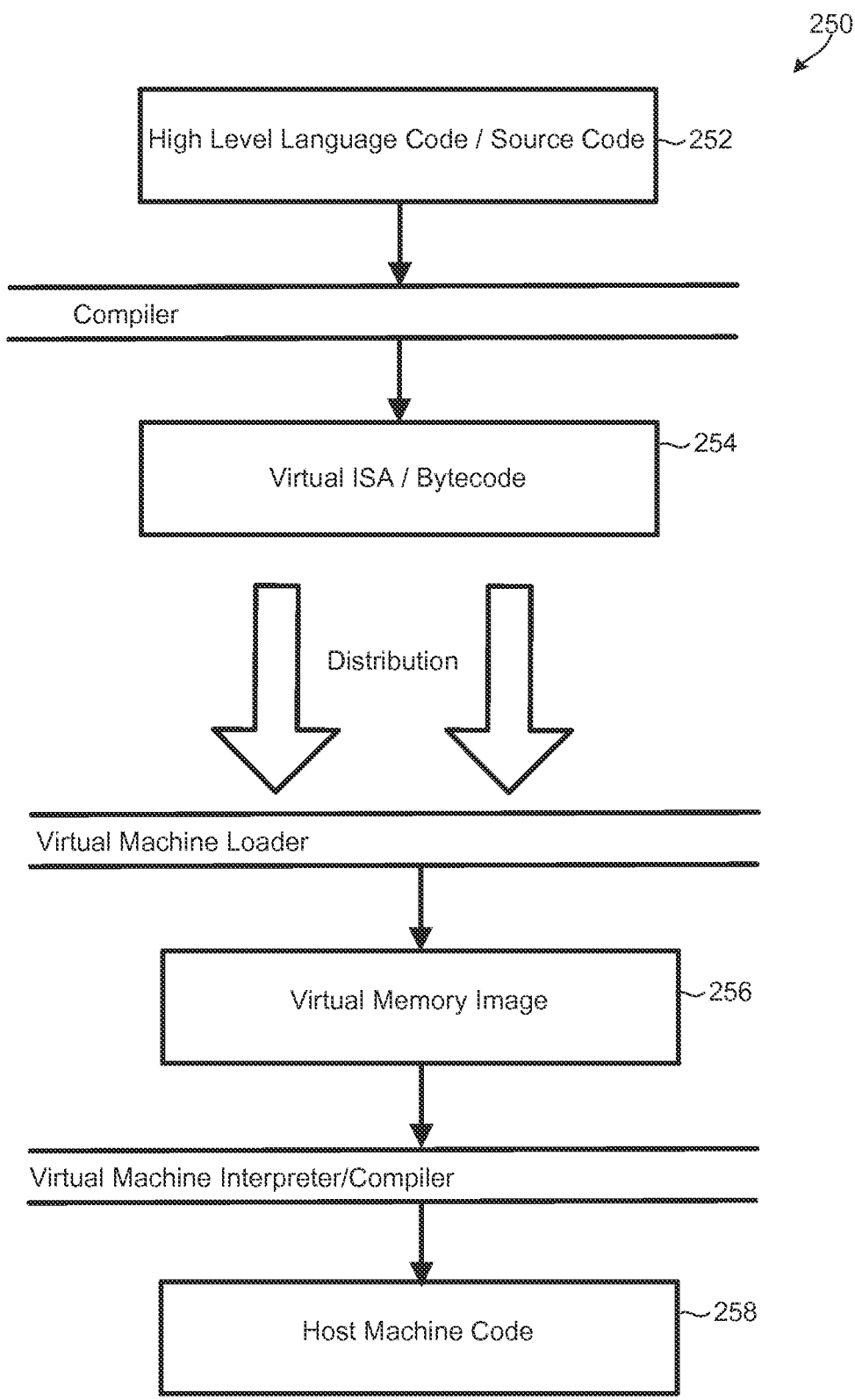

FIGS. 2A and 2B are process flow diagrams illustrating the conversion of the software applications written in a high level language (e.g., Java, C++, etc.) into distributable code. As mentioned above, mobile device application programs are typically distributed as compiled binary files (referred to as "object code") that are tied to a specific ISA and operating system interface (OSI).

FIG. 2A illustrates a method 200 for converting code from a high level language 202 to the distributable binary object code 206 for delivery to a mobile device. Application developers may write source code 202 using a high level language (Java, C++, etc.), which may be converted into object code 206 by a compiler. The compiler may be logically organized into a front-end component, a middle-end component, and a back-end component. The compiler front-end may receive the source code 202 and perform type checking operations, check the source code's syntax and semantics, and generate an intermediate representation 204 of the source code ("intermediate code"). The compiler middle-end may perform operations for optimizing the intermediate code 204, such as removing useless or unreachable code, relocating computations, etc. The compiler back-end may translate the optimized intermediate code 204 into binary/object code 206, which encodes the specific machine instructions that will be executed by a specific combination of hardware and OSI. The binary/object code 206 may then be distributed to devices supporting the specific combination of ISA and OSI for which the binary was generated, and may be stored in a physical memory and retrieved by a loader as a memory image 208.

FIG. 2B illustrates an aspect method 250 for converting code from a high level language source code 252 to the distributable code 254 for delivery to a mobile device having virtualization software. A compiler module may receive source code 252 written in a high level language and generate abstract machine code in a virtual instruction set architecture (Virtual ISA code) and/or bytecode 254 that specifies a virtual machine interface. The compiler module may generate the Virtual ISA code/bytecode 254 without performing any complex middle-end and back-end compiler processing that ties the code to a specific architecture or operating system. The generated virtual ISA code/bytecode 254 may be distributed to mobile devices having a wide variety of platforms and execution environments, so long as the mobile devices include virtualization software that supports the virtual ISA used to generate the Virtual ISA code/bytecode 254.

A computing device having virtualization software installed may receive the distribution bytecode 254 and store the received code in a memory as a virtual memory image 256. The virtualization software may include an interpreter/compiler for translating the virtual ISA instructions into the actual ISA instructions used by the underlying hardware. A virtual machine loader may load a virtual memory image 256 of the received code and pass the received code on to the virtual machine interpreter/compiler, which may interpret the virtual memory image and/or compile the virtual ISA code contained thereon, to generate guest/host machine code 258 for direct execution on the guest/host platform.

The compilation of the code may be performed in two steps, one before distribution and one after distribution. This allows the software applications to be easily ported to any computing device having virtualization software that supports the virtual ISA used by the first compiler, regardless of the device's underlying hardware and operating system interface. Moreover, the virtual machine compiler may be configured to process the code considerably faster than the full compiler, because the virtual machine compiler needs only to convert the virtual ISA into the guest/host machine instructions.

Thus, in method 200 illustrated in FIG. 2A the code is distributed as machine/object code (e.g., ARM executable), whereas in the aspect method 250 illustrated in FIG. 2B, the code is distributed as abstract machine code/bytecode (e.g., Dalvik bytecode). In either case, a static optimizer may optimize the code before distribution (e.g., during compilation). However, the specific characteristics of the hardware on which the code is to be executed on is not available to the static optimizer, and generally cannot be known until runtime. For this reason, static optimizers typically use generic optimization routines that optimize the code to run more efficiently (i.e., faster) on a wide variety of platforms and execution environments. These generic optimization routines cannot take into consideration the specific characteristics of the individual hardware on which the code is executed, such as the power consumption characteristics of a specific processor. The various aspects use virtualization techniques to optimize the code at runtime, using the specific characteristics of the hardware on which the code is to be executed to reduce the amount of energy required to execute the code.

Figure 3A:
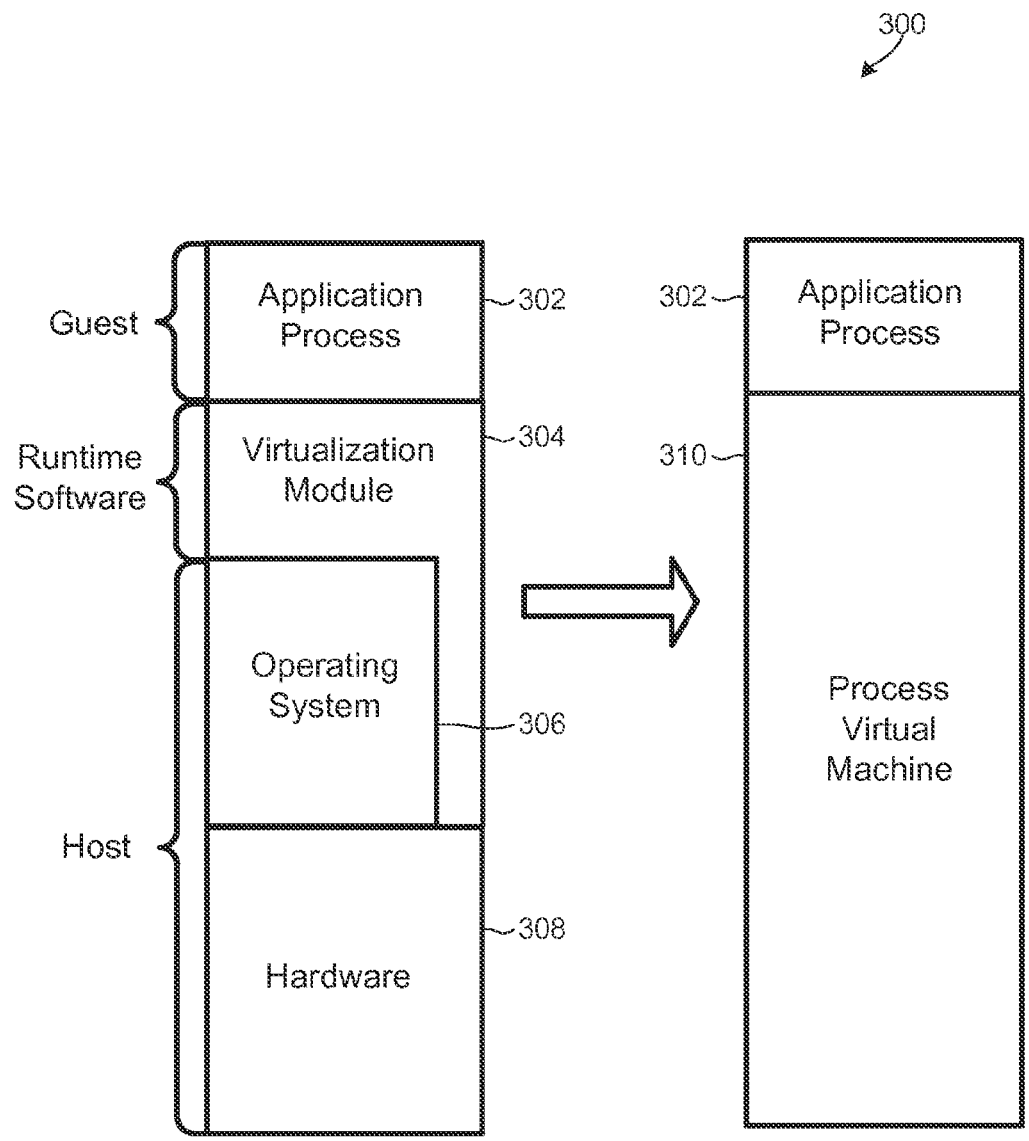
FIGS. 3A and 3B are layered computer architectural diagrams illustrating logical components in virtual machines suitable for implementing the various aspects.
Figure 3B:
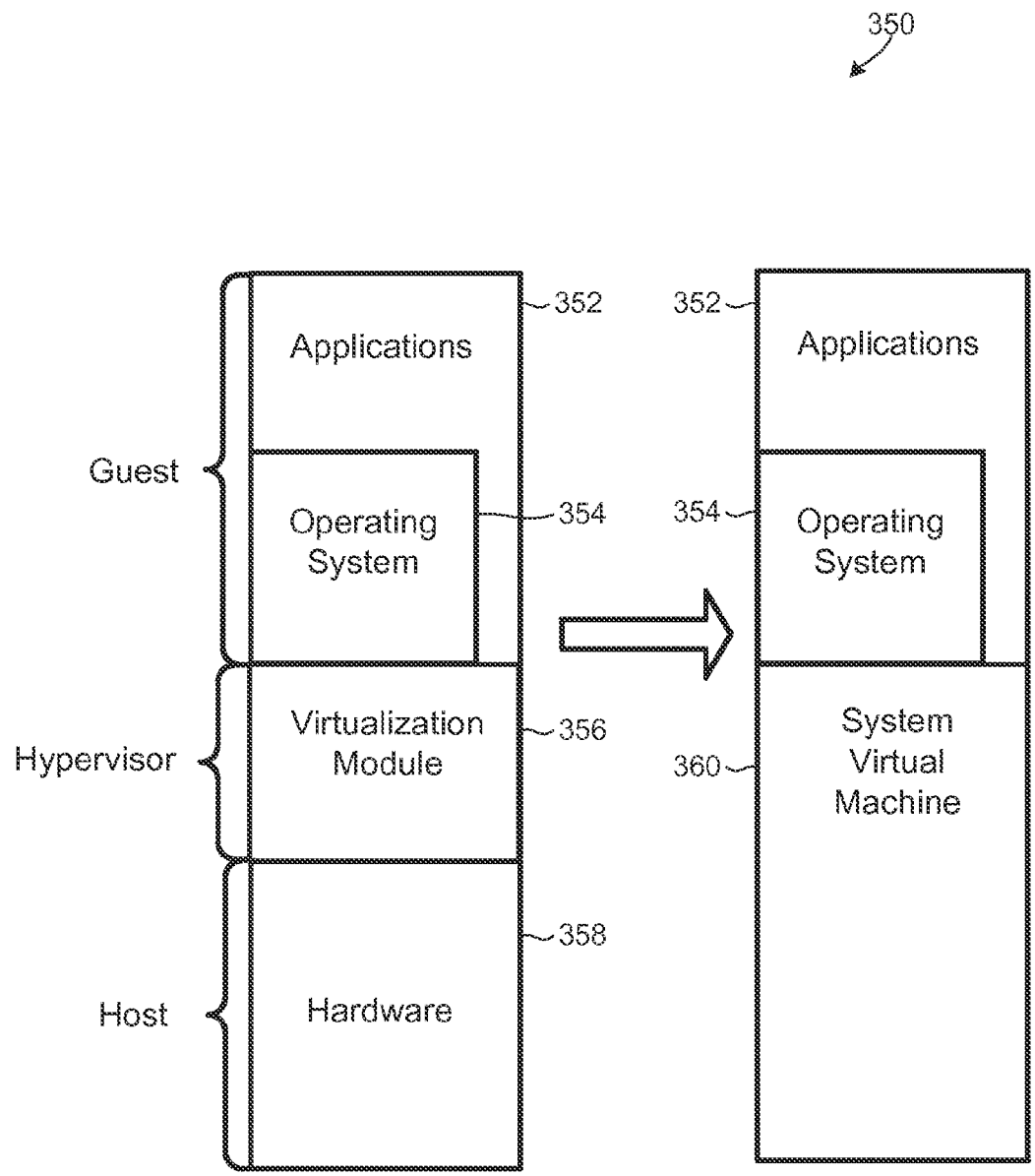

FIGS. 3A and 3B illustrate the logical components in a typical computer system implementing a virtual machine. As discussed above, virtual machines allow application programs tied to a specific ISA to execute on hardware implementing a different instruction set architecture. These virtual machines may be categorized into two general categories: system virtual machines and process virtual machines System virtual machines allow the sharing of the underlying physical hardware between different processes or applications, whereas process virtual machines support a single process or application.

FIG. 3A is a layered architectural diagram illustrating logical layers of a computing device 300 implementing a process virtual machine 310. The computing device 300 may include hardware 308 components (e.g., execution hardware, memory, I/O devices, etc.), and software components that include a virtualization module 304, an operating system 306, and an application module 302.

As discussed above with reference to FIG. 1, hardware components are only visible to the application programs through the operating system, and the ABI and API effectively define the hardware features available to the application program. The virtualization software module 304 performs logical operations at the ABI/API level and emulates operating system calls and/or library calls such that the application process 302 communicates with the virtualization software module 304 in the same manner it would otherwise communicate with hardware components (i.e., via system/library calls). In this manner, the application process 302 views the combination of the virtualization module 304, operating system 306 and hardware 308 as a single machine, such as the process virtual machine 310 illustrated in FIG. 3A.

As mentioned above, the process virtual machine 310 exists solely to support a single application process 302. The process virtual machine 310 is created with the process 302 and terminated when the process 302 finishes execution. The process 302 that runs on the virtual machine 310 is called a "guest" and the underlying platform is called the "host." Virtualization software 304 that implements the process virtual machine is typically called runtime software (or simply "runtime").

As an example, Dalvik is a process virtual machine (VM) on the Google™ Android operating system. The Android operating system converts Dalvik bytecode to ARM executable object code prior to execution. However, the power consumption characteristics of the hardware are not taken into consideration when generating the ARM object code. Moreover, since the process virtual machine 310 is created with the process 302 and terminated when the process 302 finishes, information about the execution of the process 302 cannot be used to optimize other, concurrent, processes.

FIG. 3B is a layered architectural diagram illustrating the logical layers in a computing device 350 implementing a system virtual machine 360. The computer system may include hardware 358 components (e.g., execution hardware, memory, I/O devices, etc.) and software components that include a virtualization module 356, an operating system 354, and an application programs module 352. Software that runs on top of the virtualization module 356 is referred to as "guest" software and the underlying platform that supports the virtualization module is referred to as "host" hardware.

The virtualization software module 356 may be logically situated between the host hardware and the guest software. The virtualization software may run on the actual hardware (native) or on top of an operating system (hosted), and is typically referred to as a "hypervisor" or virtual machine monitor (VMM). The hypervisor provides the guest software with virtualized hardware resources and/or emulates the hardware ISA such that the guest software can execute a different ISA than the ISA implemented on the host hardware.

Unlike process virtual machines, a system virtual machine 360 provides a complete environment on which the multiple operating systems can coexist. Likewise, the host hardware platform may be configured to simultaneously support multiple, isolated guest operating system environments. The isolation between the concurrently executing operating systems adds a level of security to the system. For example, if security on one guest operating system is breached, or if one guest operating system suffers a failure, the software running on other guest systems is not affected by the breach/failure. Moreover, the system virtual machine may use information gained from the execution of one process to optimize other, concurrent, processes.

As mentioned above, in a system virtual machine, virtualization software may run on the actual hardware (native) or on top of an operating system (hosted). In native configurations, the virtualization software runs in the highest privilege mode available, and the guest operating systems runs with reduced privileges such that the virtualization software can intercept and emulate all guest operating system actions that would normally access or manipulate the hardware resources. In hosted configurations, the virtualization software runs on top of an existing host operating system, and may rely on the host operating system to provide device drivers and other lower-level services. In either case, each of the guest operating systems (e.g., operating system 354) communicate with the virtualization software module 356 in the same manner they would communicate with the physical hardware 358. This allows each guest operating system (e.g., operating system 354) to view the combination of the virtualization module 356 and hardware 358 as a single, virtual machine, such as the system virtual machine 360 illustrated in FIG. 3B.

Virtual machines may emulate the guest hardware through interpretation, dynamic binary translation (DBT), or any combination thereof. In interpretation configurations, the virtual machine includes an interpreter that fetches, decodes, and emulates the execution of individual guest instructions. In dynamic binary translation configurations, the virtual machine includes a dynamic binary translator that converts guest instructions written in a first ISA into host instructions written in a second ISA. The dynamic binary translator may translate the guest instructions in groups or blocks (as opposed to instruction-by-instruction), which may be saved in a software cache and reused at a later point in time. This allows repeated executions of previously translated instructions to be performed without required a retranslation of the code, thereby improving efficiency and reducing overhead costs.

As mentioned above, dynamic binary translators convert guest instructions written in a first ISA (e.g., virtual ISA, SPARC, etc) into host instructions written in a second ISA (e.g., ARM, etc.). In the various aspects, the dynamic binary translator 414 may be configured to convert guest instructions written in a first ISA (e.g., ARM) into host instructions written in the same ISA (e.g., ARM). As part of this translation process, the dynamic binary translator 414 may perform one or more code optimization procedures to optimize the performance of the binary code based on a model of the amount of power consumed at runtime by a specific piece of hardware in performing a particular segment or sequence of code. In this processing, the dynamic binary translator 414 may identify machine operations (e.g., multiply operations) and/or hardware components that consume the most power (or run the slowest, etc.) or identify alternative hardware components and/or operations (e.g., shift-and-add) capable of achieving the same results while consuming less power (or while executing faster, etc.). The identified code segments may be translated into a format/ISA/language suitable for execution on the identified alternative hardware components and/or into the identified operations. The translated code may then be executed on the identified alternative hardware components.

Figure 4:
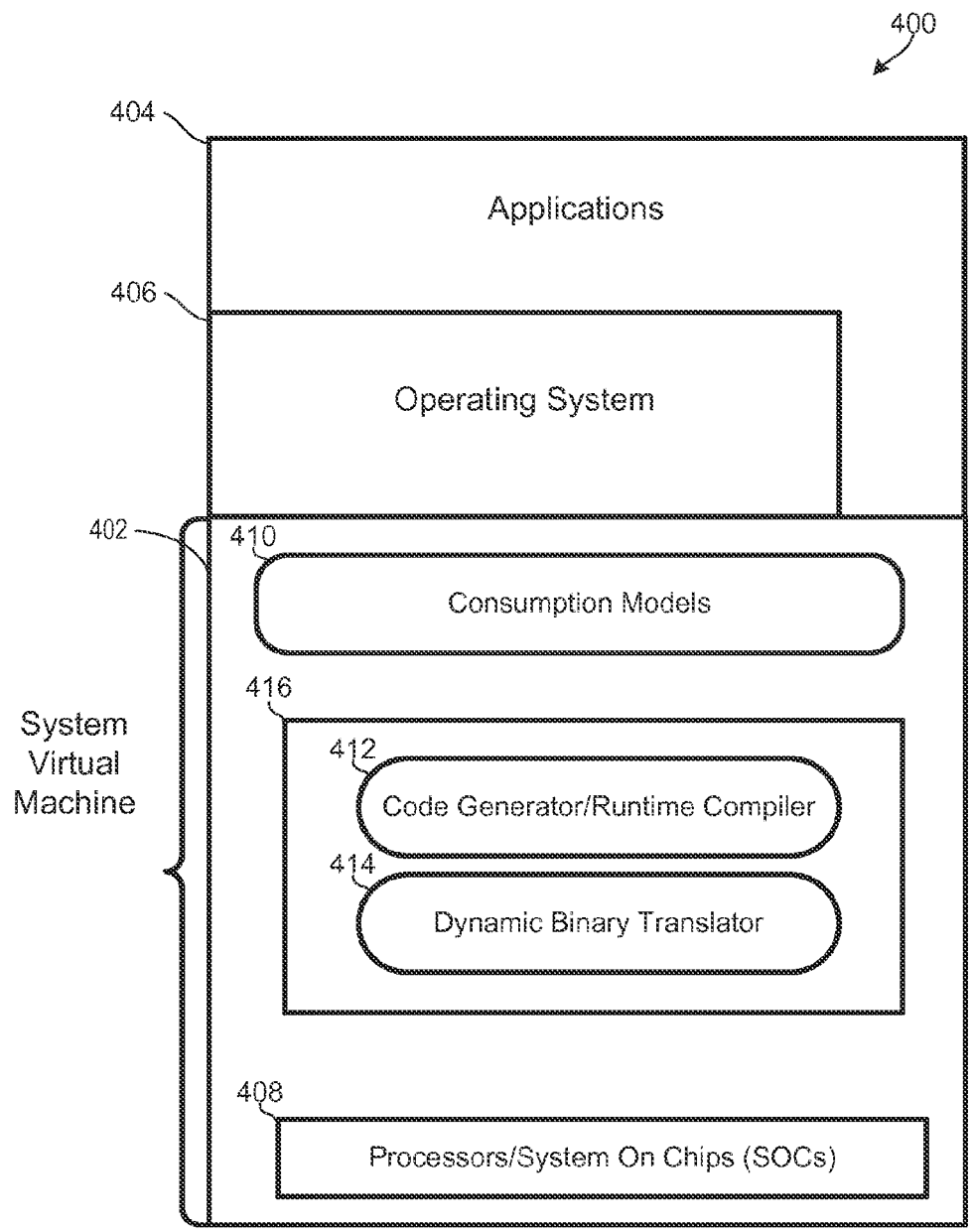
FIG. 4 is a component block diagram illustrating logical components and data flows of system virtual machine in accordance with an aspect.

FIG. 4 is a component diagram illustrating the logical components in a computing device 400 implementing a system virtual machine 402 configured to optimize the power behavior of applications 404 at runtime in accordance with the various aspects. The system virtual machine 402 may operate at the hypervisor level, beneath the operating system 406, and include one or more models (e.g., performance models, energy consumption models, etc.) 410. The system virtual machine 402 may also include a dynamic code generator/runtime compiler 412 configured to generate and/or select one or more optimization procedures specifically tailored to the execution characteristics of a specific application program or hardware component. The system virtual machine may also include a dynamic binary translator 414 configured to translate the object code into optimized object code, tailoring application programs to the exact hardware on which the applications execute. In an aspect, the code generator/runtime compiler 412 and the dynamic binary translator 414 may be implemented as a single compiler unit 416. In an aspect, the system virtual machine may be configured such that the compiler unit 416 operates on object code (as opposed to source code) and generates new object code optimized for power efficiency (versus for performance/speed).

As discussed above, the performance and power consumption characteristics of the processors may depend on both on the type of hardware and on how the hardware processes a specific unit of object code. For example, the amount of power consumed to accomplish a given processing task may vary from one type of device to another, depending upon their architectures. Moreover, the power consumption characteristics of the same type of processor can vary from lot-to-lot and chip-to-chip, in some cases up to thirty percent. Due to these variances, application developers cannot write source code optimized to a particular device or a particular set of devices, as such information is generally not available until runtime.

In an aspect, the system virtual machine 402 compiler may be configured to optimize the code at runtime, based on the actual power consumption characteristics of the hardware. The virtual machine 402 may operate at the machine layer (as opposed to the language layer), further enabling the dynamic binary translator 414 to perform optimization procedures that optimize for power consumption in addition to speed. In an aspect, the compiler unit 416 may use one or more compiler optimization routines to improve energy utilization based on the runtime performance of executing code.

In an aspect, the dynamic binary translator 414 may use profile information collected during interpretation and/or translation to optimize the binary code during execution. In addition, the dynamic binary translator 414 may use performance and power consumption information collected at runtime to modify the optimization procedures, which may be used by the dynamic binary translator 414 and/or code generator 412 to optimize future translations and/or generate re-optimized versions of the current translation. As the dynamic binary translator 414 pulls profiling data, the code generator 412 may generate tags that allow the virtual machine to associate the profiling data with a particular chuck of code. In an aspect, the dynamic binary translator 414 may use profiling parameters and generated tags to measure the amount of energy required to execute a specific chunk of code on a specific piece of hardware, and generate power optimization models and performance models based on the actual power characteristics of the hardware.

The virtual machine 402 may maintain an inventory of available processor cores and/or processors, which may include one or more system on chips (SOCs). The energy consumption models 410 may include a data-structure (e.g., list, array, table, map, etc.) used to store information for monitoring each unit of object code being processed on the different cores/processors, and the amount of power necessary to process each unit of object code on a specific core/processor. The code generator may perform binary-to-binary translation operations based on the energy consumption models to generate power optimized code.

In various aspects energy consumption models 410 may be supplied by the virtual machine authors, the authors of the application programs, and/or constructed by the virtual machine 402 at runtime using a machine learning procedure. The machine learning procedure may be generated and/or updated as the mobile device runs and executes object code. For example, the virtual machine 402 may be configured to construct the energy consumption models 410 based on information collected from previous executions of similar code, by using machine learning techniques and empirical data.

In an aspect, the virtual machine may receive a compiled binary (e.g., as bytecode or object code), analyze the code by determining how the object code will be executed by the hardware and identifying patterns within the object code that could be changed or optimized, compile/translate the code to generate optimized object code, execute the optimized object code on a hardware processor, measure the power consumption characteristics of the executing code, and generate performance and energy consumption models that may be used to analyze and optimize other code segments. In this manner, the actual performance of the mobile device processors may be used to optimize the object code, rather than relying upon a fixed model that may not reflect lot-to-lot variability in processor performance.

Figure 5:
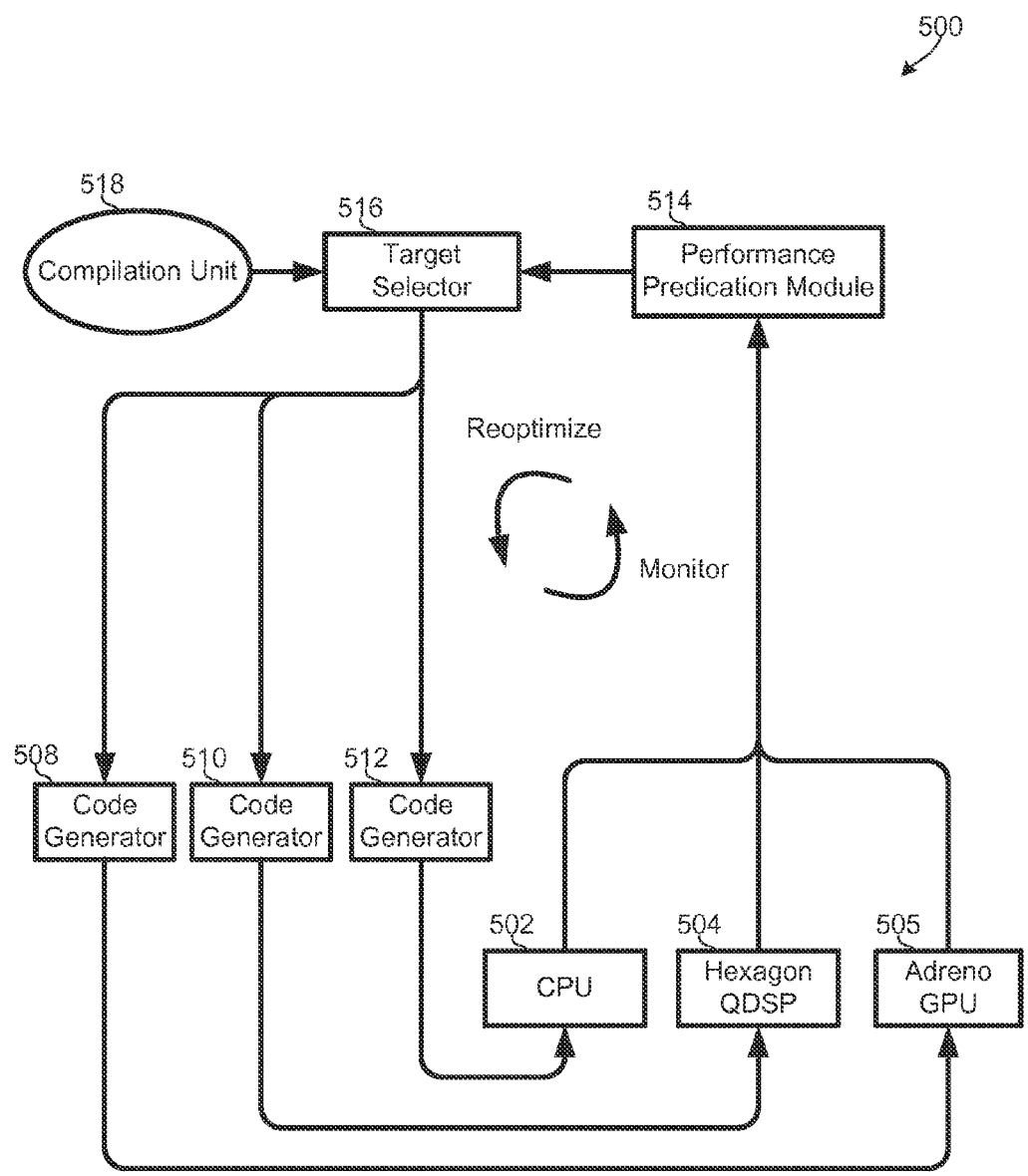
FIG. 5 is a component flow diagram illustrating logical components and data flows for optimizing the object code to execute on multiple processing units and monitoring the object code performance during execution for future re-optimization in accordance with an aspect.

FIG. 5 is a component/process flow diagram illustrating example logical components and data flows in computing device configured to perform an aspect method 500 of continuously updating the energy consumption models and regenerating the object code. As mentioned above, the virtual machine may be implemented on mobile computing device having multiple cores and/or processors, which may include one or more system on chips (SOCs). In the illustrated example of FIG. 5, the mobile computing device includes a central processor unit 502, a Hexagon QDSP SOC 504, and a graphics processing unit (GPU) 506. Each of these processors may be instrumented to measure the power consumed during execution of the generated object code.

A compilation unit 518 may generate compiler intermediate representation chunks and send the code chunks to a target selector 516. The target selector 516 may monitor the availability of the processors and select the most suitable processor for executing a segment of code (e.g., least-utilized processor, processor requiring the least amount of power, etc.). The target selector 516 may send a code chunk to a code generator module 508, 510, 512, which may receive the code chunk, and perform a instruction-sequence to instruction-sequence translation of the code to optimize the code for the selected core/processor 502, 504, 506. The optimized code may then be loaded onto the selected core/processor 502, 504, 506 for execution.

During execution, information may be collected on the amount of power consumed by each processor in processing each code chunk. The measured power consumption information may be sent to a performance prediction module 514, which compares the measured consumption information with a performance prediction model. Results of the comparison between the actual power consumption model and the predicted performance model may be fed back to the target selector 516. The target selector 516 may use the comparison results to update the power consumption models and optimization procedures, such that the power consumption characteristics of subsequently generated object code chunks are improved.

In an aspect, the hardware may be instrumented with additional circuitry to measure the power consumption characteristics of executing code. The system virtual machine may be configured to read the measurements made by the additional circuitry, and to use the measured power consumption characteristics to update models and/or perform further optimizations. For example, the virtual machine may execute one or more code units on a processor instrumented with additional circuitry to measure the power consumption characteristics of executing the code units, collect power consumption information from the execution, compare the collected information with a performance prediction model, and store the results of the comparison in a memory. The stored comparison results may then be retrieved from the memory and used to update the performance models and/or power models used by the virtual machine compilation unit to generate code units for one or more processors. The virtual machine compilation unit may also re-generate previously optimized object code units that have not yet been executed to account for the updated models.

As discussed above, mobile applications are generally distributed as object code (e.g., ARM executable) or bytecode (e.g., Dalvik bytecode) that is generically optimized for execution on a particular type or category of processors/hardware. Moreover, these generic optimization procedures are generally unaware of the existence of the additional hardware components (e.g., DSPs, GPUs, QDSPs, etc.) included in the mobile device, and cannot account for the power consumption characteristics each mobile device processor.

The various aspects analyze the object code of an application, partition the object code into portions, identify the relative power efficiencies of the mobile device processors, and route the code portions to the mobile device processors that can perform the operations in the code portions using the least amount of energy. For example, if the virtual machine determines that an object code segment can be processed more efficiently (from a power perspective) on a processor other than the CPU (e.g., in the DSP of a modem chip or in the GPU processor), that portion of the code may be re-generated in a format that is executable the other processor. As part of the code regeneration process, the virtual machine may add pointers, links, and process control instructions into the code to enable the object code to be executed by more than one processor, in the same manner they would be executed by the CPU.

Figure 6:
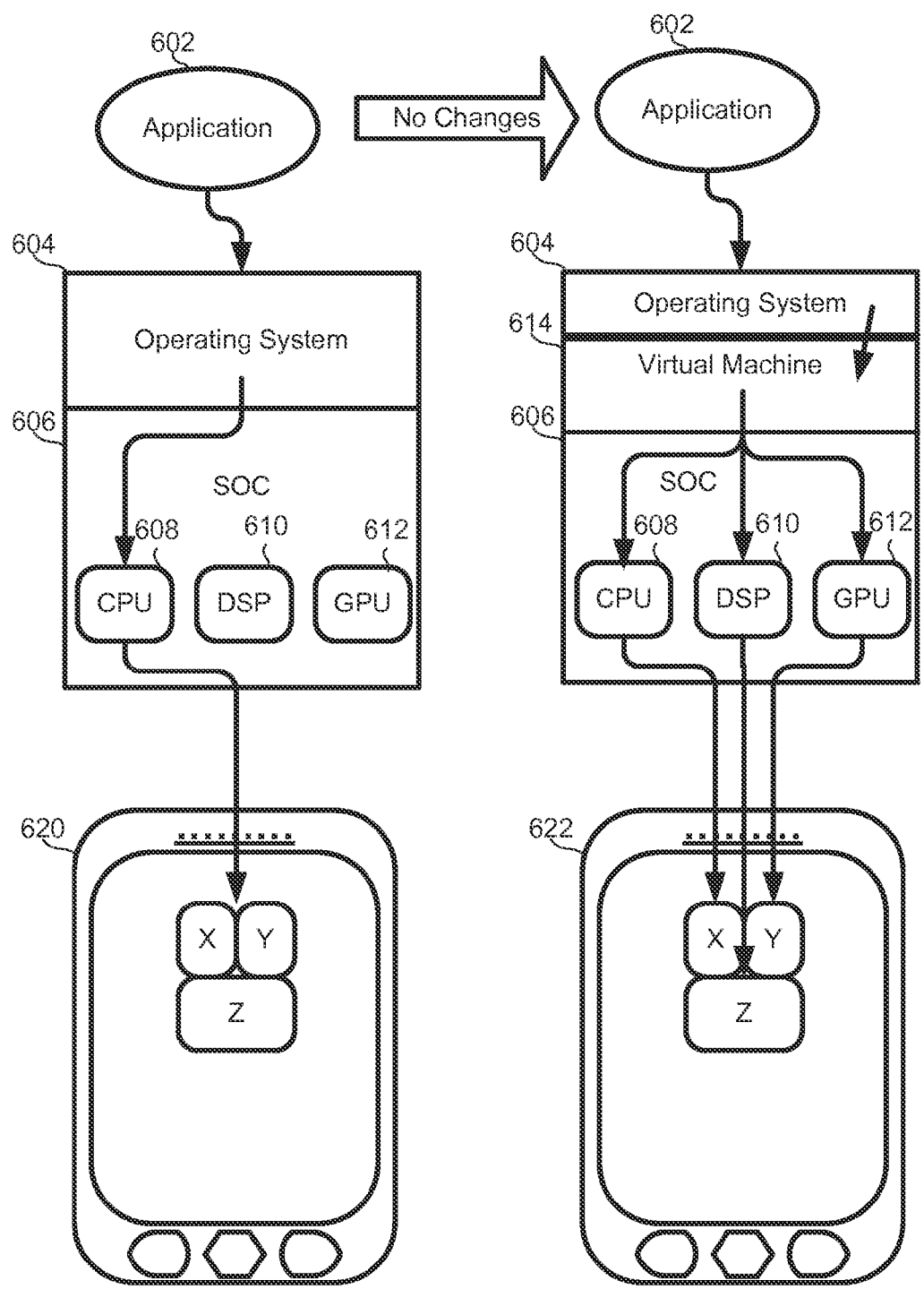
FIG. 6 is a component flow diagram illustrating logical components and data flows for partitioning object code to execute on multiple processing units in accordance with an aspect.

FIG. 6 is a component flow diagram illustrating the logical components and flows in a first computing device 620 and a second computing device 622 implementing a virtual machine, in accordance with the various aspects. Each of the first and second computing devices 620, 622 may include an operating system 604 and a system on chip 606 having a central processing unit (CPU) 608, digital signal processor (DSP) 610 and graphics processing unit (GPU) 612. Moreover, in each of the first and second computing devices 620, 622, the application program 602 may be received by the operating system 604 and processed by the system on chip 606 for display on the first and second computing devices 620, 622. However, the second computing device implements a virtual machine 614 that serves as an interface between the operating system 604 and the system on chip 606. Specifically, the virtual machine 614 may receive the application 602 as object code, partition the object code into a plurality of code portions, analyze the code portions to determine whether the code portions may be efficiently processed on one or more hardware resources (e.g., CPU 608, DSP 610, GPU 612, etc.), and route each code portion to the appropriate resources CPU 608, DSP 610, GPU 612, as required.

The virtual machine 614 may perform a dispatch of executable code for processing on the system on a chip 606. The virtual machine may include a code analysis engine, a dynamic binary translator, and a library of code patterns. At runtime, the code analysis engine may identify patterns contained within the received object code (e.g., by matching code blocks against a library of code patterns) to identify code portions that can be run more efficiently on another device processor (e.g., DSP 610, GPU 612, etc.). The virtual machine 614 may translate (e.g., via dynamic binary translator) the object code into an intermediate representation that includes portions regenerated to execute on a processor other than the CPU 608. Data flow and control flow information necessary to enable execution by more than one processor may be included in the intermediate representation. Code tags may be associated with code portions to facilitate routing the code portions to the relevant hardware resource for power efficient execution, and the dynamic binary translator may generate ARM code for the appropriate architecture specified by the code tags. An adaptor module of the virtual machine 614 may return the code to a relevant code section after processing. The virtual machine 614 may also store the generated code in a code cache and schedule execution of the code on the selected processor.

Figure 7:
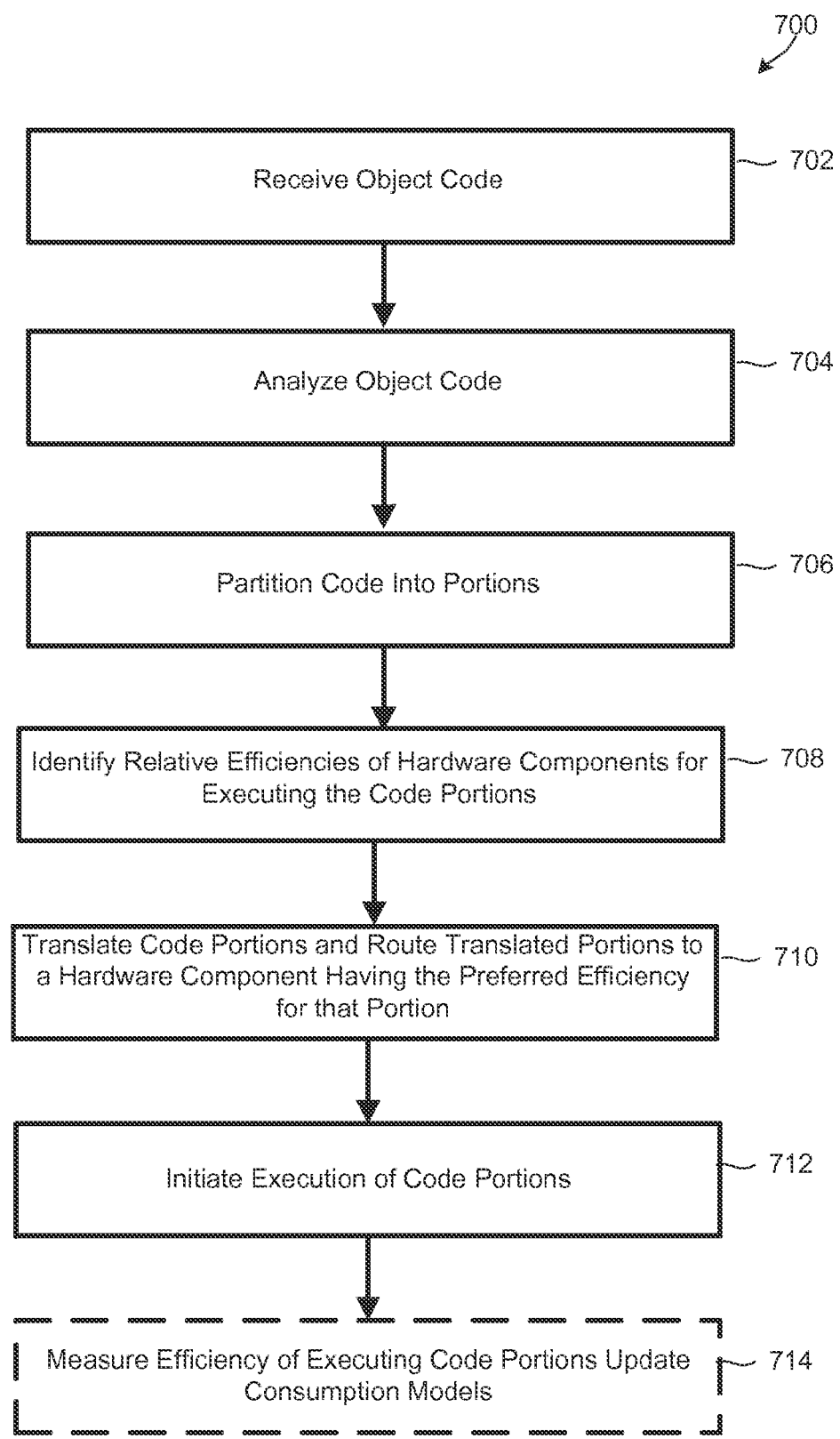
FIG. 7 is a process flow diagram illustrating an aspect method for performing object code optimizations.

FIG. 7 illustrates an aspect method 700 method for optimizing object code for executing on a computing device having more than more processing unit. In block 702, a virtual machine executing on the computing device may receive object code corresponding to an application program. In block 704, the virtual machine may analyze the object code by, for example, referencing a library of code patterns to identify portions that may be more efficiently executed on a processor other than the CPU. In block 706, a dynamic binary translator may perform an instruction-sequence to instruction-sequence translation of the code to generate code chunks corresponding to the identified portions that are compatible with the identified processor. In block 708, the virtual machine may identify the relative power efficiencies of the mobile device processors and perform operations to determine whether an object code portion can be processed more efficiently (from a power perspective) on a processor other than the CPU (e.g., in the DSP of a modem chip or in the GPU processor). In block 710, the virtual machine may route the code portions to the mobile device processors that can perform the operations in the code portions using the least amount of energy. Since this may involve significant changes to the object code, the instruction-sequence to instruction-sequence translation may translate the object code portions for the appropriate processing units, changing the object code operators to match those used by the selected processor. The virtual machine may also tag/annotate the code to monitor each portion. The virtual machine may also add pointers, links, and process control instructions into the code to enable the object code to be executed by more than one processor, in the same manner they would be executed by the CPU. In block 712, the virtual machine may initiate the execution of the code portions on their respective processors. In block 714, the virtual machine may measure the power efficiency of the executing code portions, and update the power consumption and performance models accordingly.

In the various aspects, the virtual machine may be configured to learn, over time, which binary transforms are effective on a specific unit of hardware and which transforms are not, and make adjustments as necessary. The stored comparison results may be used to identify and disable previous optimization procedures that resulted in higher, rather than lower, power consumption.

In an aspect, the system virtual machine may calculate power savings based on power consumption values collected at runtime. The system virtual machine may periodically update the power consumptions models and re-generate the code chunks based on a combination of measured power consumption characteristics and calculated power savings. Power savings may be calculated using a linear polynomial function, or as the amount of power saved over a calculated time frame, offset by the amount of work required to perform the compile/translate and optimization operations.

Various aspects may use the sum of the power savings and the energy cost of performing the compile/translate and optimization operations to determine a power function. The power function may be used to determine the net power savings associated with each power model and/or to determine whether the optimizations should be performed. For example, the power function may be used to determine if the amount of energy required to perform an optimization exceeds the amount of energy saved by the optimization, in which case the performance of the optimization may be cancelled or delayed. Models associated with optimization procedures that require more energy to perform than the amount of energy conserved by the optimized code may be stored in a memory, and performed when the computing device is not running on battery power.

In the various aspects, a variety of feedback and machine learning techniques may be used. Optimization rules may be changed or updated when the measured results depart from the predicted model. Machine perturb and test method experiments may be performed, such as by changing an optimization rule, comparing the measured power consumption of the optimized code before and after the change to the optimization rule, and selecting for use the optimization rule that renders the best results. In an aspect, the power performance of different lengths of optimized code may be compared to one another to recognize patterns to enable better optimization to occur.

The feedback and learning mechanisms present a number of advantages. For example, the mobile device developer is not required to generate the device-specific model of power consumption because the models are automatically generated by the mobile device itself through machine learning, which simplifies device development. As another example, the feedback and learning mechanisms allow the various aspects to accommodate for changes in hardware that occur after the initial design is set (e.g., addition of new memory, substitution of a processor, etc.) after the model is designed. The feedback and learning mechanisms also allows the various aspects to better account for lot-to-lot and line-to-line variability in processor power consumption characteristics, which can vary by up to twenty percent. For example, while some of the chips in from a particular die may benefit from optimizing object code in a particular manner (e.g., using shift and add operations instead of multiplication operations), a few may actually experience higher power consumption from the same optimization due to the lot-to-lot and line-to-line variability. The various aspects may account for such variability by optimizing code based on the individual characteristics of the chip/hardware.

In an aspect, the optimized object code resulting from the optimizations may be saved in memory and used for subsequent executions of the code. The optimizations may be performed in conjunction with a model of energy consumption that is specific to the particular hardware, which may be provided by the manufacture and/or learned by the mobile device during execution. In this manner, the various optimization procedures discussed above may be performed at runtime, before runtime, when the code is loaded, or the first time the process is executed. The various optimization procedures may be part of the runtime code generation process or part of the static code generation process.

It should be understood that, in the various aspects, performing optimizations when connected to power is not exclusive to performing optimizing at runtime. For example, the system virtual machine may perform optimizations as needed (e.g., during execution) or ahead of time (e.g., when connected to power and idle).

It should also be understood that the decisions regarding when to apply the optimization may be independent of the decisions when to gather performance data. The various aspects may gather data during execution and choose not to act on the collected data until a condition is met (e.g., device is connected to power).

Figure 8:
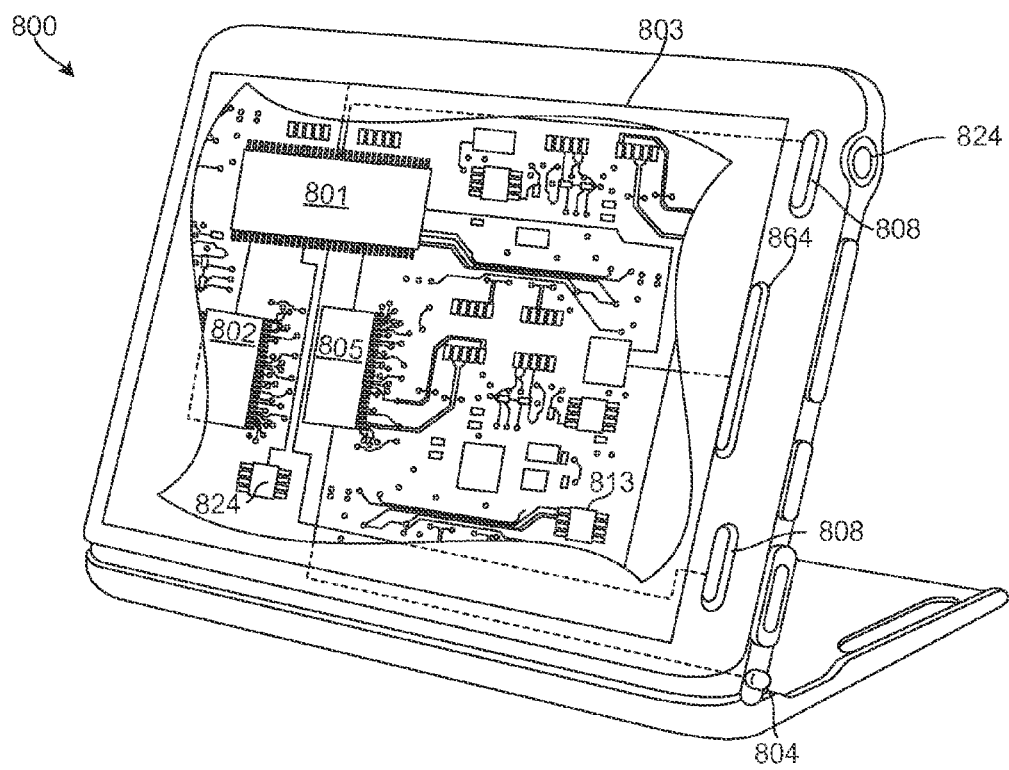
FIG. 8 is a component block diagram illustrating a mobile device suitable for implementing the various aspects.

Typical mobile devices 800 suitable for use with the various aspects will have in common the components illustrated in FIG. 8. For example, an exemplary mobile device 800 may include a processor 802 coupled to internal memory 801, a display 803, and to a speaker 864. Additionally, the mobile device may have an antenna 804 for sending and receiving electromagnetic radiation coupled to the processor 802. In some aspects, the mobile device 800 may include one or more specialized or general purpose processors 805, 824 which may include systems on chips. Mobile devices typically also include a key pad or miniature keyboard and menu selection buttons or rocker switches for receiving user inputs.

Figure 9:
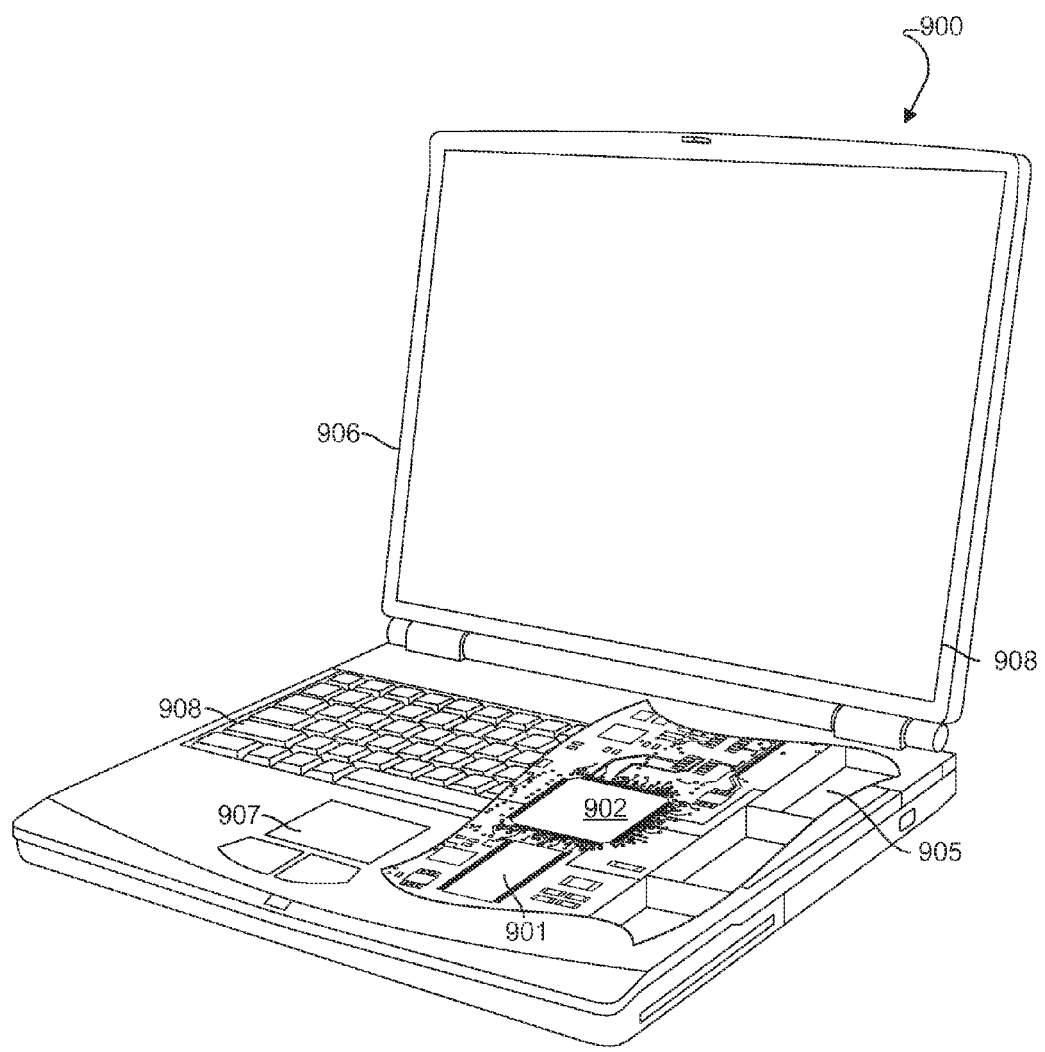
FIG. 9 is a component block diagram illustrating another mobile device suitable for implementing the various aspects.

FIG. 9 illustrates another exemplary mobile device 900 suitable for use with the various aspects. For example, the mobile device 900 may include a processor 902 coupled to internal memory 901, and a display 908. Additionally, the mobile device may have a communication port 905 for sending and receiving information. The mobile device 900 may also include a keyboard 908 and user interface buttons and/or a touch pad 907 for receiving user inputs.

The processors 802, 805, 824, 902 may be any programmable microprocessor, microcomputer or multiple processor chip or chips that can be configured by processor-executable software instructions (applications) to perform a variety of functions, including the functions of the various aspects described herein. Typically, software applications and processor-executable instructions may be stored in the internal memory 801, 901 before they are accessed and loaded into the processors 802, 805, 824, 902. In some mobile devices, the processors 802, 805, 824, 902 may include internal memory sufficient to store the application software instructions. In some mobile devices, the secure memory may be in a separate memory chip coupled to the processor 802, 805, 824, 902. In many mobile devices, the internal memory 801, 901 may be a volatile or nonvolatile memory, such as flash memory, or a mixture of both. For the purposes of this description, a general reference to memory refers to all memory accessible by the processors 802, 805, 824, 902 including internal memory, removable memory plugged into the mobile device, and memory within the processors.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for optimizing compiled object code during execution on a computing device, comprising:
    analyzing the object code to identify operations required during execution of the object code;
    partitioning the object code into object code units based on identified operations;

translating at least one object code unit into an instruction set supported by a hardware component that is different from a target hardware component for which the object code was compiled;
collecting information on an amount of power consumed by the hardware component when executing the instruction set; and
using the collected information to optimize the translations of the at least one object code unit based on the amount of power consumed by the hardware component.

2. The method of claim 1, wherein translating at least one object code unit into an instruction set supported by a hardware component comprises performing in a dynamic binary translator an instruction-sequence to instruction-sequence translation of the object code.

3. The method of claim 2, wherein performing in the dynamic binary translator an instruction-sequence to instruction-sequence translation of the object code comprises translating a first instruction set architecture into a second instruction set architecture.

4. The method of claim 3, wherein the first instruction set architecture is the same instruction set architecture as the second instruction set architecture.

5. The method of claim 1, further comprising:
identifying the performance characteristics of various hardware components of the computing device for executing the identified operations.

6. The method of claim 1, further comprising:
identifying relative power efficiencies of various hardware components of the computing device for executing the identified operations.

7. The method of claim 6, wherein identifying relative power efficiencies of various hardware components of the computing device for executing the identified operations comprises using a power consumption model for the various hardware components to predict an amount of power each hardware component may consume in executing each code unit and selecting one of the various hardware components predicted to consume a least amount of power.

8. The method of claim 1, further comprising:
comparing the amount of power consumed by the hardware component when executing the instruction set to predictions of the power consumption model; and
modifying the power consumption model based on a result of the comparison.

9. A computing device, comprising:
means for analyzing object code to identify operations required during execution of the object code;
means for partitioning the object code into object code units based on identified operations;
means for translating at least one object code unit into an instruction set supported by a hardware component that is different from a target hardware component for which the object code was compiled;
means for collecting information on an amount of power consumed by the hardware component when executing the instruction set; and
means for using the collected information to optimize the translations of the at least one object code unit based on the amount of power consumed by the hardware component.

10. The computing device of claim 9, wherein means for translating at least one object code unit into an instruction set supported by a hardware component comprises means for performing in a dynamic binary translator an instruction-sequence to instruction-sequence translation of the object code.

11. The computing device of claim 10, wherein means for performing in the dynamic binary translator an instruction-sequence to instruction-sequence translation of the object code comprises means for translating a first instruction set architecture into a second instruction set architecture.

12. The computing device of claim 11, wherein means for translating a first instruction set architecture into a second instruction set architecture comprises means for translating the instructions such that the first instruction set architecture is the same instruction set architecture as the second instruction set architecture.

13. The computing device of claim 9, further comprising:
means for identifying the performance characteristics of various hardware components of the computing device for executing the identified operations.

14. The computing device of claim 9, further comprising:
means for identifying relative power efficiencies of various hardware components of the computing device for executing the identified operations.

15. The computing device of claim 14, wherein means for identifying relative power efficiencies of various hardware components of the computing device for executing the identified operations comprises means for using a power consumption model for the various hardware components to predict an amount of power each hardware component may consume in executing each code unit and selecting one of the various hardware components predicted to consume a least amount of power.

16. The computing device of claim 9, further comprising:
means for comparing the amount of power consumed by the hardware component when executing the instruction set to predictions of the power consumption model; and
means for modifying the power consumption model based on a result of the comparison.

17. A computing device, comprising:
a memory; and
a processor coupled to the memory, wherein the processor is configured with processor-executable instructions to perform operations comprising:
analyzing the object code to identify operations required during execution of the object code;
partitioning the object code into object code units based on identified operations;
translating at least one object code unit into an instruction set supported by a hardware component that is different from a target hardware component for which the object code was compiled;
collecting information on an amount of power consumed by the hardware component when executing the instruction set; and
using the collected information to optimize the translations of the at least one object code unit based on the amount of power consumed by the hardware component.

18. The computing device of claim 17, wherein the processor is configured with processor-executable instructions such that translating at least one object code unit into an instruction set supported by a hardware component comprises performing in a dynamic binary translator an instruction-sequence to instruction-sequence translation of the object code.

19. The computing device of claim 18, wherein the processor is configured with processor-executable instructions such that performing in the dynamic binary translator an instruction-sequence to instruction-sequence translation of the object code comprises translating a first instruction set architecture into a second instruction set architecture.

20. The computing device of claim 19, wherein the processor is configured with processor-executable instructions such that the first instruction set architecture is the same instruction set architecture as the second instruction set architecture.

21. The computing device of claim 17, wherein the processor is configured with processor-executable instructions for identifying the performance characteristics of various hardware components of the computing device for executing the identified operations.

22. The computing device of claim 17, wherein the processor is configured with processor-executable instructions for identifying relative power efficiencies of various hardware components of the computing device for executing the identified operations.

23. The computing device of claim 22, wherein the processor is configured with processor-executable instructions such that identifying relative power efficiencies of various hardware components of the computing device for executing the identified operations comprises using a power consumption model for the various hardware components to predict an amount of power each hardware component may consume in executing each code unit and selecting one of the various hardware components predicted to consume a least amount of power.

24. The computing device of claim 17, wherein the processor is configured with processor-executable instructions to perform operations further comprising:
    comparing the amount of power consumed by the hardware component when executing the instruction set to predictions of the power consumption model; and
    modifying the power consumption model based on a result of the comparison.

25. A non-transitory computer readable storage medium having stored thereon processor-executable software instructions configured to cause a processor to perform operations for optimizing object code during execution on a computing device, the operations comprising:
    analyzing the object code to identify operations required during execution of the object code;
    partitioning the object code into object code units based on identified operations;
    translating at least one object code unit into an instruction set supported by a hardware component that is different from a target hardware component for which the object code was compiled;
    collecting information on an amount of power consumed by the hardware component when executing the instruction set; and
    using the collected information to optimize the translations of the at least one object code unit based on the amount of power consumed by the hardware component.

26. The non-transitory computer readable storage medium of claim 25, wherein the stored processor-executable software instructions are configured to cause a processor to perform operations such that translating at least one object code unit into an instruction set supported by a hardware component comprises performing in a dynamic binary translator an instruction-sequence to instruction-sequence translation of the object code.

27. The non-transitory computer readable storage medium of claim 26, wherein the stored processor-executable software instructions are configured to cause a processor to perform operations such that performing in the dynamic binary translator an instruction-sequence to instruction-sequence translation of the object code comprises translating a first instruction set architecture into a second instruction set architecture.

28. The non-transitory computer readable storage medium of claim 27, wherein the stored processor-executable software instructions are configured to cause a processor to perform operations such that the first instruction set architecture is the same instruction set architecture as the second instruction set architecture.

29. The non-transitory computer readable storage medium of claim 25, wherein the stored processor-executable software instructions are configured to cause a processor to perform operations for identifying the performance characteristics of various hardware components of the computing device for executing the identified operations.

30. The non-transitory computer readable storage medium of claim 25, wherein the stored processor-executable software instructions are configured to cause a processor to perform operations for identifying relative power efficiencies of various hardware components of the computing device for executing the identified operations.

31. The non-transitory computer readable storage medium of claim 30, wherein the stored processor-executable software instructions are configured to cause a processor to perform operations such that identifying relative power efficiencies of various hardware components of the computing device for executing the identified operations comprises using a power consumption model for the various hardware components to predict an amount of power each hardware component may consume in executing each code unit and selecting one of the various hardware components predicted to consume a least amount of power.

32. The non-transitory computer readable storage medium of claim 25, wherein the stored processor-executable software instructions are configured to cause a processor to perform operations further comprising:
    comparing the amount of power consumed by the hardware component when executing the instruction set to predictions of the power consumption model; and
    modifying the power consumption model based on a result of the comparison.

* * * * *